United States Patent Office 2,753,320
Patented July 3, 1956

2,753,320

POLYACRYLONITRILE SOLUTIONS CONTAINING GELATION INHIBITORS

Karl Glenn Siedschlag, Jr., Waynesboro, Va., assignor to E. I. du Pont de Nemours and Company, Wilmington, Del., a corporation of Delaware No Drawing. Application March 19, 1953,
Serial No. 343,529

8 Claims. (Cl. 260—32.6)

This invention relates to improved solution stability of acrylonitrile polymers and of copolymers predominantly of acrylonitrile. More particularly, this invention is directed to inhibiting gelation of solutions of polyacrylonitrile and copolymers composed of at least 85% polyacrylonitrile.

Acrylonitrile polymers and copolymers containing at least 85% acrylonitrile are difficultly soluble. Even in N,N-dimethylformamide, one of the better known solvents, solution at satisfactory concentration levels for evaporative spinning is effected only at elevated temperatures, such as above 100° C. When such solutions are maintained at elevated temperatures for a period of time, the solution viscosity increases gradually at first and then more rapidly until after a number of hours, gelation of the solution takes place. Under normal operating conditions, a 23% solution of polyacrylonitrile in N,N-dimethylformamide maintained at a temperature of 125° C. will increase in viscosity tenfold in about 60 hours and will set to a rigid gel within a few hours thereafter. This time at which the solution has increased in viscosity by a factor of 10 will hereinafter be referred to as the "gel time" of the solution.

The gelation of spinning solutions of polyacrylonitrile and of copolymers containing at least 85% polyacrylonitrile at elevated temperatures is a very serious problem in the production of high quality filaments, fibers, yarns and similar articles. Deposits of gel are known to form on the walls of equipment handling spinning solutions, and small pieces of gel that work loose from the walls or that form in stagnant areas cause non-uniformities in the spun structures and seriously affect subsequent drawing as is evidenced by poor continuity of drawing and lowered quality in the fiber product produced. It is, therefore, extremely important that some way of increasing gel time of spinning solutions be provided.

Accordingly, an object of this invention is to provide adjuvants for solutions in organic solvents of polyacrylonitrile and copolymers containing at least 85% polyacrylonitrile, whereby the "gel time" of the solution is materially increased. Other objects will be apparent from the description that follows.

After extensive research and testing, it was found that certain adjuvants effectively inhibit gelation of spinning solutions. This invention accomplishes the objective by incorporating in organic solutions of polyacrylonitrile or of its copolymers containing at least 85% acrylonitrile an adjuvant which is soluble in the solution and which is, or is capable of becoming in situ, a compound defined by the following general formula:

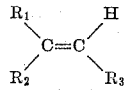

where $R_1$ and $R_2$ are electropositive elements or groups, such as hydrogen, alkyl or aryl, while $R_3$ is an electronegative group containing a chalcogen of atomic weight between 15 and 33 (oxygen or sulfur) and connected to the unsaturated carbon by means of carbonyl or sulfonyl. Some compounds conforming to this structure, or convertible in situ to conform, and effective in inhibiting gelation of acrylonitrile polymer solutions are:

| Name | Structure |
|---|---|
| Methyl vinyl sulfone | $H_2C=CHSO_2-CH_3$ |
| Methyl vinyl ketone | $H_2C=CHC-CH_3$ $\parallel$ $O$ |
| 2-Ethylhexyl acrylate | $H_2C=CHCOOC_6H_{12}-C_2H_5$ |
| n-Butyl acrylate | $H_2C=CHCOOC_4H_9$ |
| Methyl acrylate | $H_2C=CHCOOCH_3$ |
| Mesityl oxide | $H_3C-C=CHCOCH_3$ $\mid$ $CH_3$ |
| Allylidene diacetate | $H_2C=CHCH(OOC-CH_3)_2$ |
| Allylidene chloride | $H_2C=CHCHCl_2$ |
| Acrolein | $H_2C=CHCHO$ |
| Crotonaldehyde | $H_3C-C=CHCHO$ $\mid$ $H$ |
| Methyl Crotonate | $H_3C-CH=CHCOOCH_3$ |
| Methyl styryl ketone | $C_2H_5CH=CHCOCH_3$ |
| Ethyl cinnamate | $C_6H_5CH=CHCOOC_2H_5$ |
| Methyl sorbate | $H_3CCH=CHCH=CHCOOCH_3$ |

It is essential that the alpha-carbon, to which the electronegative group containing oxygen or sulfur is attached through carbon or sulfur, also holds a hydrogen atom. For instance, methyl acrylate is effective, but methyl methacrylate

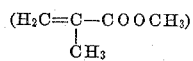

is not. Similarly, the group attached to the alpha-carbon in addition to hydrogen must be electronegative. Styrene ($C_6H_5CH=CH_2$) for instance is not effective. Moreover, this electronegative group must not be joined to the alpha-carbon through oxygen. To illustrate, vinyl benzoate ($H_2C=CHOOCC_6H_5$) has no beneficial effects on the gel time of the solution. Also, the beta-carbon must be satisfied with hydrogen or electropositive groups, such as methyl, phenyl, or the like. While methyl vinyl ketone, crotonaldehyde, mesityl oxide and methyl styryl ketone are all effective as gelation inhibitors, compounds carrying an electronegative group on the beta-carbon instead of the electropositive group, such as m-nitrobenzal acetophenone ($O_2NC_6H_5CH=CHCOC_6H_5$) or p-nitrocinnamic acid ($O_2NC_6H_5CH=CH-COOH$) are not. In addition to the above list of effective compounds are butyl vinyl sulfonate and ethyl vinyl sulfoxides. The acids corresponding to the esters described above and herein may be used instead of the esters, but it is preferred to use esters since they are neutral compounds and may be used without affecting the pH of the media.

In the list of effective compounds given above is allylidene diacetate. In itself, this compound fails to satisfy the definition given of having an electronegative group attached to the unsaturated carbon. However, in the polymer solution allylidene diacetate slowly hydrolyzes to acrolein and thus acquires the negative group —CHO. The list also includes allylidene chloride because it is similarly converted to acrolein in the polymer solution.

Generally only a small quantity of adjuvant is necessary to increase the gel time substantially and in many instances, as little as 0.2% of the gelation inhibitor based on the total weight of the solution, or about 0.8% based on the weight of the polymer in the solution, is sufficient to increase the gel time noticeably. On the other hand, when a long gel time of the solution is desired, as much as 2.5% adjuvant by weight based on the solution, or 10% or more based on the polymer, may be used to good advantage.

In the shaping of articles, the solutions contain an amount of polymer dependent in part on the article to be formed. Generally, the solutions contain about 5% to about 40% polymer, by weight, though higher or lower amounts can be used. Preferably, in fiber formation, the solutions contain about 10% to about 35% of the polymer.

The following examples are given to illustrate this invention further without any intention of being limited thereby. Parts and percentages given are by weight.

EXAMPLE I

A solution consisting of 22.95% polyacrylonitrile, 0.23% of methyl vinyl sulfone and 76.82% of N,N-dimethylformamide containing about 0.25% water was held at a temperature of 125° C.; it reached its "gel time" in 153 hours. A similar solution of 22.90% polyacrylonitrile, 0.46% of methyl vinyl sulfone and 76.64% of N,N-dimethylformamide containing about 0.25% water, when maintained at a temperature of 125° C., did not reach its gel time until 216 hours had passed. A control solution (23% polyacrylonitrile and 77% N,N-dimethylformamide containing about 0.25% water) when tested under the same conditions reached its gel time in about 60 hours.

EXAMPLE II

A solution prepared of 23 parts of polyacrylonitrile and 0.23 part of methyl vinyl ketone, and 76.77 parts of N,N-dimethylformamide containing about 0.25% water, when maintained at a temperature of 125° C., reached its gel time in 144 hours. A similar solution prepared from 22.7 parts polyacrylonitrile, 1.15 parts methyl vinyl ketone and 76.2 parts of N,N-dimethylformamide containing about 0.25% water was held at a temperature of 125° C.; the gel time was not reached until 340 hours had passed. The control solution as before reached its gel time in about 60 hours.

EXAMPLE III 22.9 parts of polyacrylonitrile, 0.46 part of 2-ethylhexyl acrylate and 76.64 parts of N,N-dimethylformamide containing about 0.25% water were put together to form a solution which was then heated to a temperature of 125° C. It required 98 hours to get to the gel time. Again, the control solution showed a gel time of about 60 hours.

EXAMPLE IV

A solution consisting of 22.95% polyacrylonitrile, 0.23% of n-butyl acrylate and 76.82% of N,N-dimethylformamide containing about 0.25% water, when maintained at a temperature of 125° C., reached its gel time in 94 hours. A similar solution of 22.7% polyacrylonitrile, 1.10% of n-butyl acrylate and 76.2% of N,N-dimethylformamide containing about 0.25% water, when maintained at a temperature of 125° C., did not reach its gel time until 177 hours had passed. The control solution had a gel time of about 60 hours.

EXAMPLE V

To 76.2 parts of N,N-dimethylformamide containing about 0.25% water was added 1.1 parts of methyl acrylate. The adjuvant dissolved therein and into the resultant solution 22.7 parts of polyacrylonitrile in finely powdered form was first dispersed and then dissolved. The solution was heated to and maintained at a temperature of 125° C. for 157 hours, at the end of which time the solution viscosity had increased tenfold. A control solution reached its gel time in about 60 hours.

EXAMPLE VI

A solution consisting of 22.9% polyacrylonitrile, 0.46% of allylidine diacetate and 76.64% of N,N-dimethylformamide containing about 0.25% water, when maintained at a temperature of 125° C., reached its gel time in 103 hours. A control solution reached its gel time in about 60 hours.

EXAMPLE VII

The copolymers listed below in Table I were prepared to contain from about 4% to 10% copolymerizing material and the balance acrylonitrile. These copolymers were separately dissolved in N,N-dimethylformamide solution containing about 0.25% water to form 23% solutions of the copolymer and the gel time was determined while maintaining the solution at 125° C. The results, "gel time in hours," are contained in Table I. Similar solutions consisting of 23% of copolymer, 0.5% methyl vinyl ketone and 76.5% of N,N-dimethylformamide containing about 0.25% water, when maintained at 125° C., did not increase as much as tenfold in viscosity within 150 hours.

Table I

| Copolymer | Gel Time in Hours Control |
|---|---|
| Acrylonitrile/methylacrylate | 59 |
| Acrylonitrile/2-vinyl pyridine/vinyl acetate | 31 |
| Acrylonitrile/N-tertiary octyl acrylamide | 47 |
| Acrylonitrile/2-butoxyethyl methacrylate | 44 |

EXAMPLE VIII

Twenty-three (23) parts of polyacrylonitrile were dissolved in 77 parts of N,N-dimethylacetamide and maintained at a temperature of 125° C. for 150 hours, when the solution viscosity had increased tenfold. A similar solution containing 23% acrylonitrile polymer, 0.5% mesityl oxide and 76.5% N,N-dimethyl acetamide, when heated at 125° C. for 250 hours was still fluid and its viscosity had not increased as much as tenfold.

EXAMPLE IX

A solution consisting of 23% polyacrylonitrile, 0.5% of methyl styryl ketone and 76.5% N,N-dimethylformamide containing about 0.25% water, when maintained at a temperature of 125° C., did not increase as much as tenfold in viscosity within 100 hours, whereas the viscosity of a control solution increased tenfold in about 60 hours.

EXAMPLE X

A solution prepared from 15 parts of polyacrylonitrile and 85 parts of tetramethylene sulfone when heated in a sealed tube under air-free conditions at a temperature of 140° C. reached its gel time in 37 hours. A similar solution containing additionally 1.0 part of ethyl vinyl ketone when heated under identical conditions did not reach its gel time within 100 hours.

EXAMPLE XI

A solution consisting of 13.6% polyacrylonitrile, 1% methyl vinyl sulfone and 85.4% of freshly distilled gamma-butyrolactone when heated in a sealed tube under air-free conditions at a temperature of 140° C. did not reach its gel time within 100 hours. A control solution consisting of 13.6% polyacrylonitrile and 86.4% of freshly distilled gamma-butyrolactone when heated in a sealed tube under identical conditions reached its gel time in 59 hours.

EXAMPLE XII

A solution prepared from 17.7 parts of acrylonitrile polymer, 82.3 parts of ethylene carbonate and 2 parts of n-butylacrylate when heated in a loosely stoppered tube did not reach its gel time within 100 hours. A control solution free of n-butylacrylate reached its gel time in about 60 hours.

The invention has been described primarily with respect to N,N-dimethylformamide solutions of polyacrylonitrile, since these solutions are widely used and gelation inhibition in such solutions is greatly desired. However, numerous other solutions involving other organic solvents may be improved in gel time by the practice of this invention. The solutions disclosed in U. S. Patents Nos.

2,404,714–2,404,727 will be benefited by the practice of this invention as are N,N-dimethylacetamide solutions of acrylonitrile polymers and of copolymers containing at least 85% acrylonitrile. The invention is applicable not only to the homopolymer and the specific copolymers above mentioned but to many other copolymers, such as those mentioned in U. S. Patent No. 2,436,926 and the copolymers may be made up from two or more copolymerizable monomers.

By the practice of this invention, the length of time which solutions of acrylonitrile polymers can be held in tanks, pipe lines, or other equipment prior to spinning or otherwise shaping into products is greatly increased. Moreover, when the hold-up time is not changed, the character of the solution modified in accordance with this invention is so much improved that gel deposits on the walls of the containers are substantially eliminated and as a consequence, gel particles are not picked up in the flowing stream to produce heterogeneity in the fibers or other structures initially formed. As a result, breaks and irregularities in subsequent drawing of these fibers is greatly reduced. Furthermore, the drawn filamentary products produced from these improved solutions are more uniform in physical and dyeing properties.

Any departure which conforms to the principles of this invention is intended to be included within the scope of the claims below.

I claim:

1. A process for inhibiting the gelation at temperature of at least 100° C. of a solution of an acrylonitrile polymer formed from monoethylenically unsaturated monomeric material and containing in the polymer molecule at least 85% acrylonitrile by weight, comprising incorporating in said solution from about 0.2% to about 2.5%, based on the weight of said solution, of a compound from the class consisting of aldehydes, thioaldehydes, ketones, sulfones, esters, and sulfonates corresponding to the formula $$R_1-C=C-R_3$$
$$\phantom{R_1-}|\phantom{C=C}|$$
$$\phantom{R_1-C=}R_2\phantom{C-}H$$

wherein $R_1$ and $R_2$ from the group consisting of hydrogen and alkyl and aryl radicals, and $R_3$ contains a radical from the group consisting of carbonyl and sulfonyl and is linked to the unsaturated carbon thereby.

2. A process in accordance with claim 1 in which said polymer is polyacrylonitrile.

3. A process in accordance with claim 1 in which said polymer is a copolymer.

4. A process in accordance with claim 1 in which said compound is methyl vinyl ketone.

5. A process in accordance with claim 1 in which said compound is methyl vinyl sulfone.

6. A process in accordance with claim 1 in which said polymer is dissolved in N,N-dimethylformamide.

7. A process in accordance with claim 1 in which said polymer is dissolved in N,N-dimethylacetamide.

8. A process in accordance with claim 1 in which said solution contains about 5% to about 40%, by weight, of said polymer.

References Cited in the file of this patent

UNITED STATES PATENTS

| | | |
|---|---|---|
| 2,528,710 | Richards | Nov. 7, 1950 |
| 2,549,913 | Lytton | Apr. 24, 1951 |
| 2,661,347 | Wesp | Dec. 1, 1953 |